United States Patent
Duong et al.

(10) Patent No.: US 9,068,515 B2
(45) Date of Patent: Jun. 30, 2015

(54) ACCESSORY GEARBOX WITH TOWER SHAFT REMOVAL CAPABILITY

(75) Inventors: Hung Duong, Unionville, CT (US); Gabriel L. Suciu, Glastonbury, CT (US); Christopher M. Dye, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 850 days.

(21) Appl. No.: 13/313,433

(22) Filed: Dec. 7, 2011

(65) Prior Publication Data

US 2013/0145774 A1   Jun. 13, 2013

(51) Int. Cl.
*F02C 7/32* (2006.01)
*F02C 7/36* (2006.01)
*F16H 1/20* (2006.01)

(52) U.S. Cl.
CPC ............. *F02C 7/32* (2013.01); *Y10T 29/49464* (2015.01); *F02C 7/36* (2013.01); *F16H 1/20* (2013.01); *F05D 2250/312* (2013.01)

(58) Field of Classification Search
CPC ............... F02C 7/32; F02C 7/36; F16H 1/20; F16H 1/14; F16H 1/12; F16H 1/24
See application file for complete search history.

(56) References Cited

U.S. PATENT DOCUMENTS

| | | | |
|---|---|---|---|
| 1,143,537 A * | 6/1915 | Green | 74/424 |
| 3,363,477 A * | 1/1968 | Clarkson et al. | 74/421 R |
| 3,688,560 A | 9/1972 | Broman et al. | |
| 4,829,850 A | 5/1989 | Soloy | |
| 5,501,636 A * | 3/1996 | Janke et al. | 464/48 |
| 6,789,522 B2 | 9/2004 | Seymour | |
| 7,386,983 B2 | 6/2008 | Miller | |
| 7,500,365 B2 | 3/2009 | Suciu et al. | |
| 7,937,949 B2 | 5/2011 | Eccles et al. | |
| 2002/0040613 A1 | 4/2002 | Brooks | 74/423 |
| 2009/0290976 A1 | 11/2009 | Suciu et al. | |
| 2011/0289936 A1 | 12/2011 | Suciu et al. | |
| 2012/0117981 A1 * | 5/2012 | Suciu et al. | 60/802 |
| 2012/0117982 A1 * | 5/2012 | Suciu et al. | 60/802 |
| 2013/0193688 A1 * | 8/2013 | Duong et al. | 290/47 |

OTHER PUBLICATIONS

International Search Report and Written Opinion for PCT Application No. PCT/US2012/068070 mailed Aug. 6, 2013.
International Preliminary Report on Patentability for International Application No. PCT/US20121068070 mailed on Jun. 19, 2014.

* cited by examiner

*Primary Examiner* — William H Rodriguez
(74) *Attorney, Agent, or Firm* — Carlson, Gaskey & Olds, P.C.

(57) ABSTRACT

An accessory system for a gas turbine engine includes an accessory gearbox which defines an accessory gearbox axis and includes first and second sides. A first geartrain includes one or more shafts rotatable about axes perpendicular to the first side of the accessory gearbox and a second geartrain includes one or more shafts rotatable about axes perpendicular to the second side of the accessory gearbox. A driven gear set defines an input axis and drives first geartrain and the second geartrain about corresponding first and second drive axes parallel to the input axis.

14 Claims, 5 Drawing Sheets

ACCESSORY GEARBOX WITH TOWER SHAFT REMOVAL CAPABILITY

BACKGROUND

This disclosure generally relates to an accessory gearbox for driving auxiliary systems of a gas turbine engine.

Aircraft powered by gas turbine engines often include a mechanically driven accessory gearbox to drive accessory systems such as fuel pumps, scavenge pumps, electrical generators, hydraulic pumps, etc. These components typically operate at different speeds from one another and require differing amounts of horsepower as provided by the accessory gearbox.

Conventional gas turbine engine accessory gearboxes utilize a gearbox case mountable underneath the engine. The gearbox case is typically crescent-shaped with forward and aft faces to which the accessory components are mounted. The accessory gearbox is driven by an angle gearbox through a lay shaft which axially extends from the gearbox case. A towershaft driven by the engine high-pressure spool drives the lay shaft through the angle gearbox. An ongoing issue with respect to accessory gearboxes is the ease by which they can be serviced and/or removed from the engine.

SUMMARY

An accessory system for a gas turbine engine according to an exemplary embodiment of this disclosure, among other possible things, includes an accessory gearbox which defines an accessory gearbox axis, the accessory gearbox including a first side and a second side, a first geartrain within the accessory gearbox including a first set of shafts rotatable about axes perpendicular to the first side of the accessory gearbox and a second geartrain within the accessory gearbox including a second set of shafts rotatable about axes perpendicular to the second side of the accessory gearbox. The accessory gearbox further includes a driven gear set defining an input axis, a first drive gear set driven by the driven gear set about a first drive axis for driving the first gear set, and a second drive gear set driven by the driven gear set about a second drive axis for driving the second gear set, wherein the first drive axis and the second drive axis are parallel to the input axis.

In a further embodiment of the foregoing accessory system embodiment, the first drive gear set comprises a first spur gear, the second drive gear set comprises a second spur gear, and the driven gear comprises a drive spur gear driving the first and second spur gears.

In a further embodiment of any of the foregoing accessory system embodiments, the first drive gear set includes a first bevel gear for driving the first geartrain and the second drive gear set includes a second bevel gear for driving the second geartrain, wherein the first bevel gear defines a first inclusive angle between the first side and the first drive axis and the second bevel gear defines a second inclusive angle between the second side and the second drive axis.

In a further embodiment of any of the foregoing accessory system embodiments, the first inclusive angle is independent of the second inclusive angle.

In a further embodiment of any of the foregoing accessory system embodiments, including a first spur angle between the accessory gearbox axis and the first drive axis and a second spur angle between the accessory gearbox axis and the second drive axis.

In a further embodiment of the foregoing accessory system embodiment where the first spur angle is independent of the second spur angle.

In a further embodiment of an of the foregoing accessory system embodiments where a tower shaft drives the driven gear set.

In a further embodiment of any of the foregoing accessory system embodiments, the driven gear set is removable from the accessory gearbox such that the tower shaft is removable through the accessory gearbox.

In a further embodiment of any of the foregoing accessory system embodiments, the first geartrain drives at least one accessory component removably mounted to the first side and the second geartrain drives at least one accessory component removably mounted to the second side.

In a further embodiment of any of the foregoing accessory system embodiments, the accessory gearbox includes an aft side transverse to the first and second sides and an aft geartrain including a shaft rotatable about an axis perpendicular to the aft side, the aft geartrain driven by one of the first and second geartrains for driving at least one accessory component mounted to the aft side.

A gas turbine engine according to an exemplary embodiment of this disclosure, among other possible things, includes an engine case section defined about an engine axis of rotation and an accessory gearbox which defines an accessory gearbox axis parallel to the engine axis of rotation. The accessory gearbox is mounted to the engine case section and includes first and second sides, a first geartrain including a first set of shafts aligned within a first plane transverse to the first side of the accessory gearbox, a second geartrain within the accessory gearbox including a second set of shafts aligned within a second plane transverse to the second side of the accessory gearbox, a driven gear set defining an input axis, a first drive gear set driven by the driven gear set about a first drive axis for driving the first gear set, the first drive gear set including a first bevel gear defining a first inclusive angle between the first drive axis and the first plane, and a second drive gear set driven by the driven gear set about a second drive axis for driving the second gear set, the first drive gear set including second bevel gear defining a second inclusive angle between the second drive axis and the second plane.

In a further embodiment of the foregoing gas turbine engine embodiment, the first geartrain drives at least one accessory component removably mounted to the first side and the second geartrain drives at least one accessory component removably mounted to the second side.

In a further embodiment of any of the foregoing gas turbine engine embodiments, the first and second drive axes are parallel to the input axis.

In a further exemplary embodiment of any of the foregoing gas turbine engine embodiments, a tower shaft drives the driven gear set and is removable through the accessory gearbox.

An exemplary method of removing a tower shaft of this disclosure, among other possible things includes the steps of providing an accessory gearbox with first and second driven gear sets disposed parallel to an input axis of a tower shaft, removing a gear for driving both of the first and second driven gear sets mounted to the tower shaft, and moving the tower shaft through the accessory gearbox past the first and second driven gear sets.

In a further exemplary embodiment of the foregoing method, a coupler shaft supported within the accessory gearbox coupled to the tower shaft is removed.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
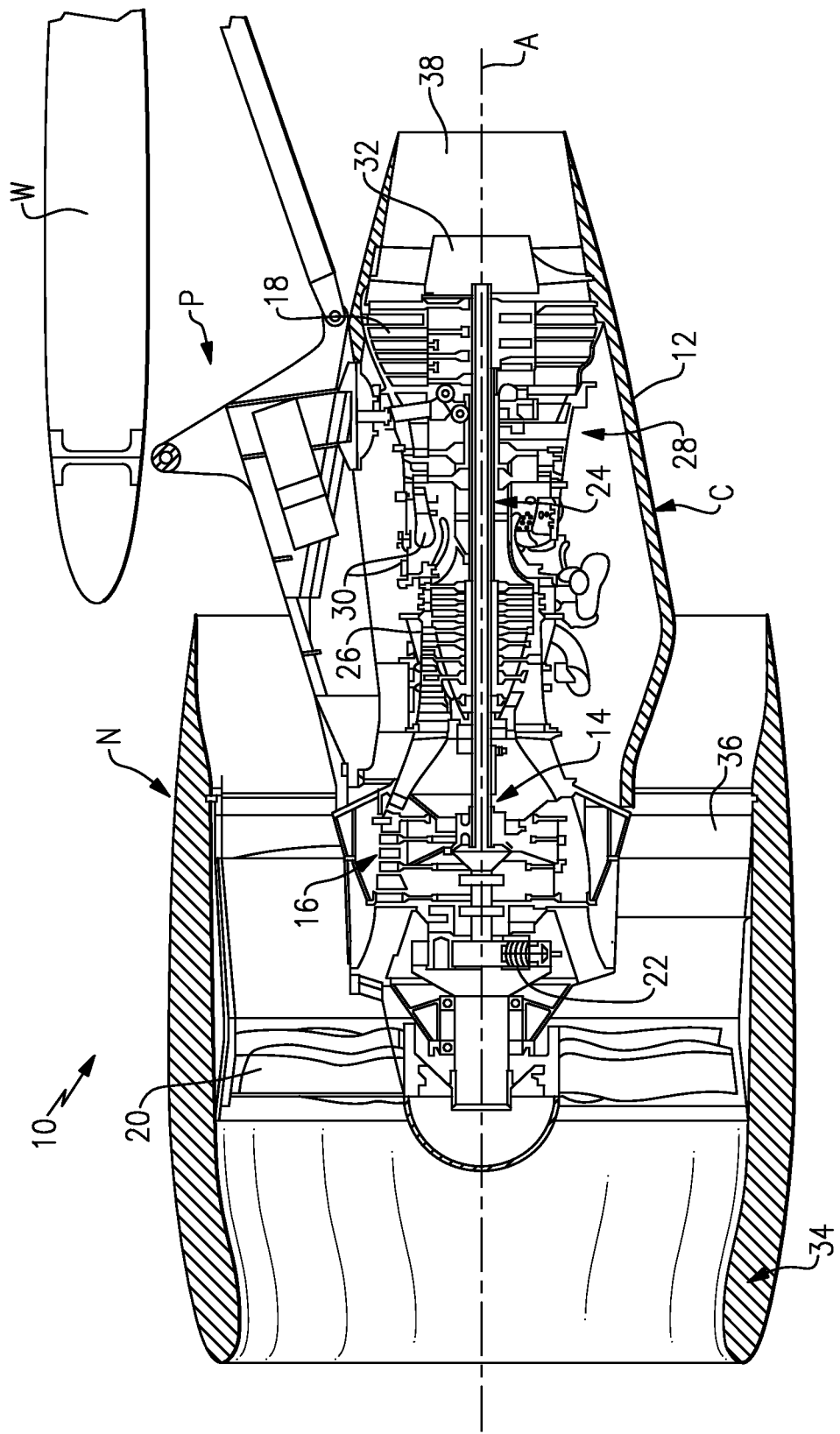
FIG. 1 is a general sectional view through an embodiment of a gas turbine engine along the engine longitudinal axis.

FIG. 1 illustrates a general partial fragmentary schematic view of an embodiment of a gas turbine engine 10 suspended from an engine pylon P within an engine nacelle assembly N as is typical of an aircraft designed for subsonic operation. The engine pylon P or other support structure is typically mounted to an aircraft wing W; however, the engine pylon P may alternatively extend from other aircraft structure such as an aircraft empennage.

The gas turbine engine 10 includes a core engine C within a core nacelle 12 that houses a low spool 14 and high spool 24. The low spool 14 includes a low pressure compressor 16 and low pressure turbine 18. The low spool 14 may drive a fan section 20 either directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present application is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and, through the optional gear train 22, the fan section 20 in response to the expansion. A core engine exhaust exits the core nacelle 12 through a core nozzle 38 defined between the core nacelle 12 and a tail cone 32.

A bypass flow path is defined between the core nacelle 12 and the fan nacelle 34. The engine 10 generates a high bypass flow arrangement with a bypass ratio in which approximately 80 percent or more of the airflow entering the fan nacelle 34 becomes bypass flow. The bypass flow communicates through the generally annular bypass flow path.

Figure 2:
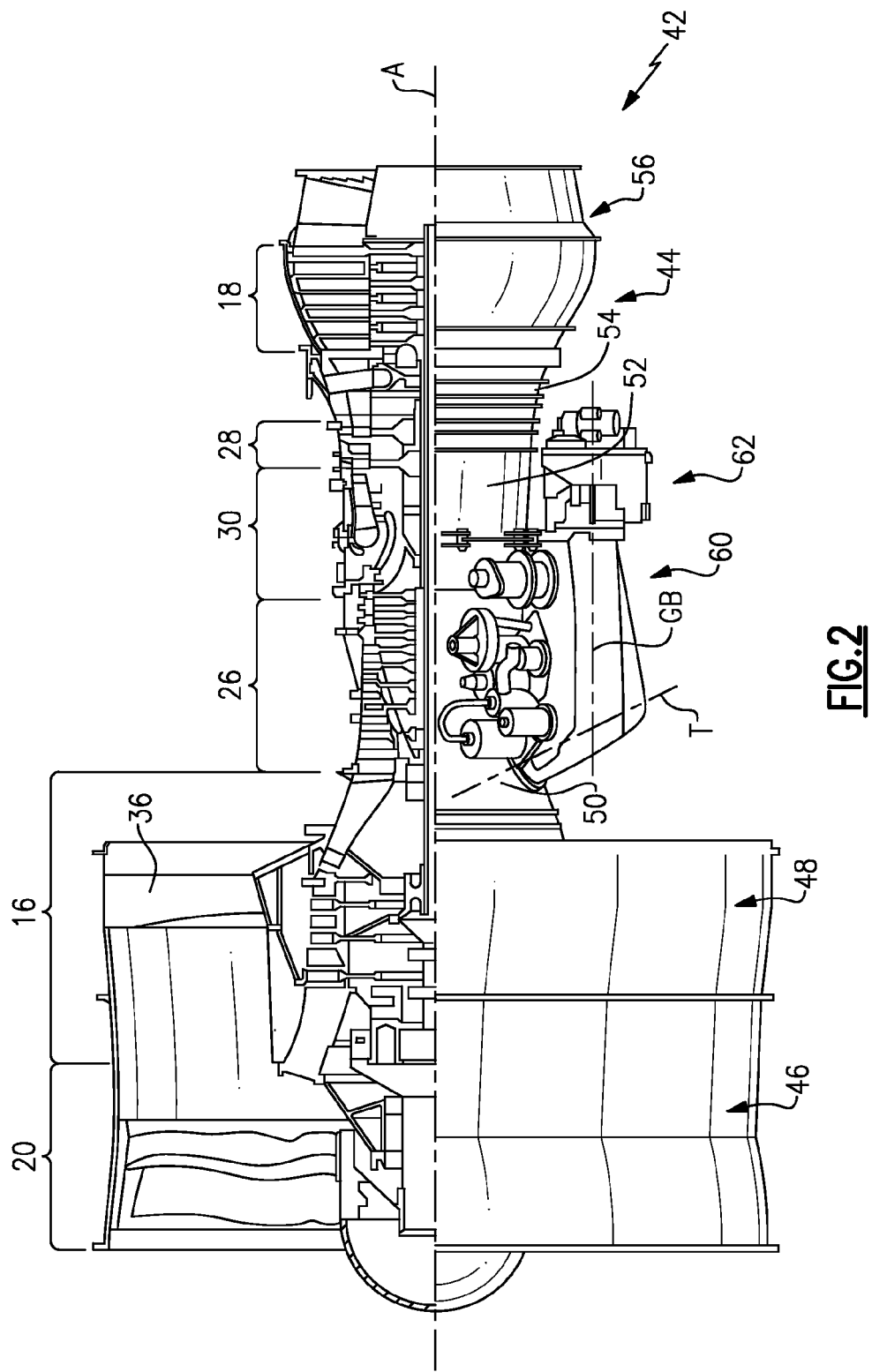
FIG. 2 is a general partial sectional view through an embodiment of a gas turbine engine along the engine longitudinal axis.

Referring to FIG. 2, engine static structure 42 includes sub-structures such as a core engine case structure 44 often referred to as the engine backbone. The engine case structure 44 generally includes a fan case 46, an intermediate case (IMC) 48, a high pressure compressor case 50, a diffuser case 52, a low pressure turbine case 54, and a turbine exhaust case 56. The core engine case structure 44 is secured to the fan case 46 at the IMC 48 which includes a multiple of circumferentially spaced radially extending fan exit guide vanes (FEGVs) 36.

Figure 3:
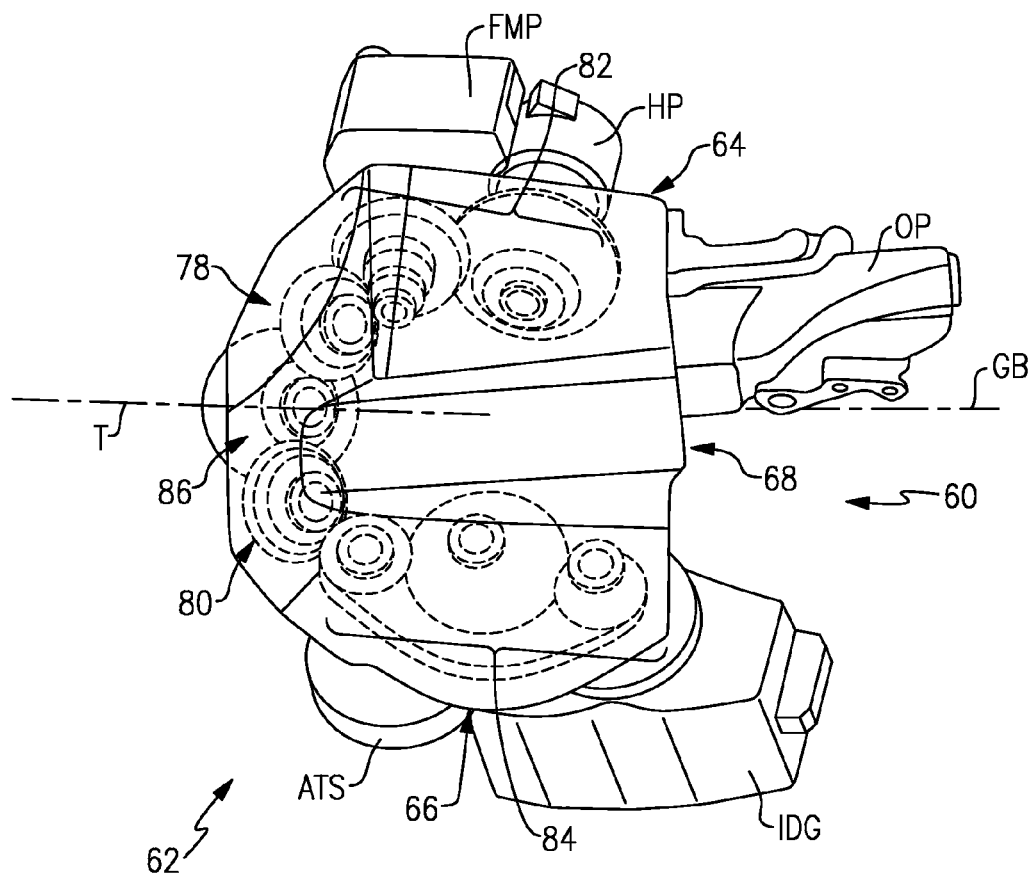
FIG. 3 is a bottom view of an example accessory system for a gas turbine engine.

An accessory gearbox 60 is mounted to the case structure 44 generally parallel to the engine axis of rotation A. The accessory gearbox 60 takes advantage of the significant axial area within the core nacelle 12 (FIG. 1) to support an engine accessory system 62 which may include accessory components (AC) such as an Air Turbine Starter (ATS), a deoiler (D), a hydraulic pump (HP), an oil pump (OP), an integrated drive generator (IDG), a permanent magnet alternator (PMA), a fuel pump module (FPM), and others (FIG. 3). It should be understood, that any number and type of accessory components AC may alternatively or additionally be provided.

Referring to FIG. 3, the accessory gearbox 60 includes a first geartrain 82 and a second geartrain 84 driven by corresponding first and second driven gear sets 78, 80. The first geartrain 82 includes shafts rotatable about axes perpendicular to a first side 64. The second geartrain 84 includes shafts rotatable about axes perpendicular to a second side 66. The first and second drive gear sets 78, 80 are driven by a driven gear set 86 that rotates about an input axis T.

Accessory components are removably mounted to one of the first and second sides 64, 66 and driven by the corresponding one of the geartrains 82, 84. In this example, the first geartrain 82 drives the FPM and HP, and the second geartrain 84 drives the ATS and IDG. The example accessory gearbox 60 further includes an aft side 68 that supports a removably mounted OP.

Each of the first and second sides is disposed parallel to the engine axis A and adjacent the engine case structure 44. The parallel and adjacent mounting provides for reductions to component removal envelops. Moreover, the disclosed mounting provides more efficient supply conduit attachment and routing. Although a specific example is disclosed and described, different components and position are within the contemplation of this disclosure.

Figure 4:
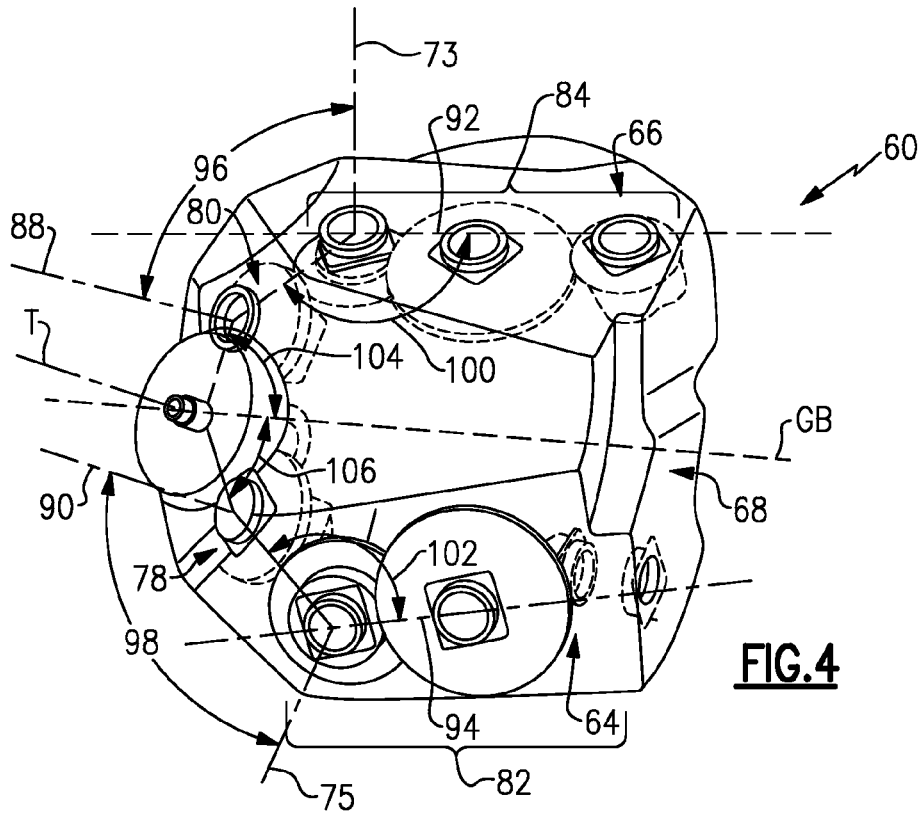
FIG. 4 is a top view of an example accessory gearbox for a gas turbine engine.
Figure 5:
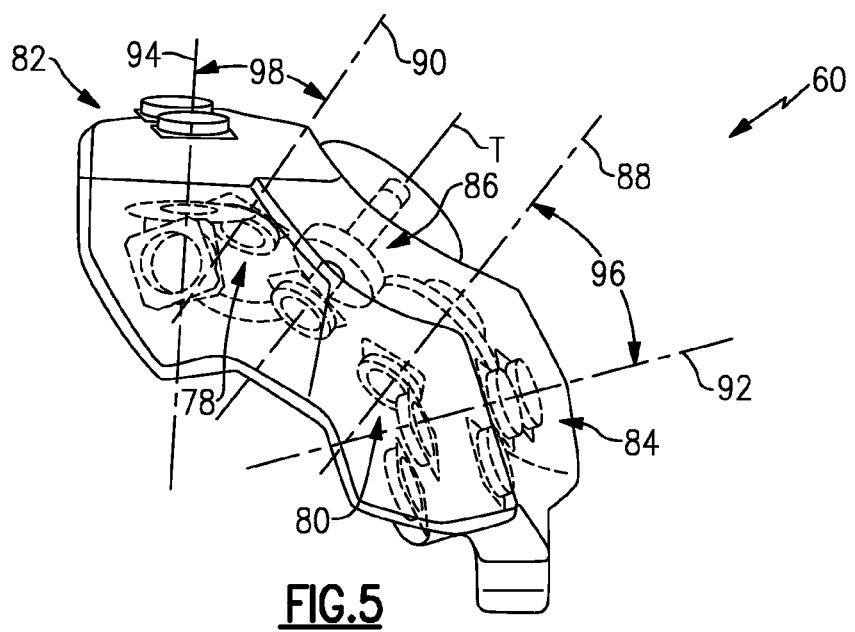
FIG. 5 is a front view of the example accessory gearbox.
Figure 6:
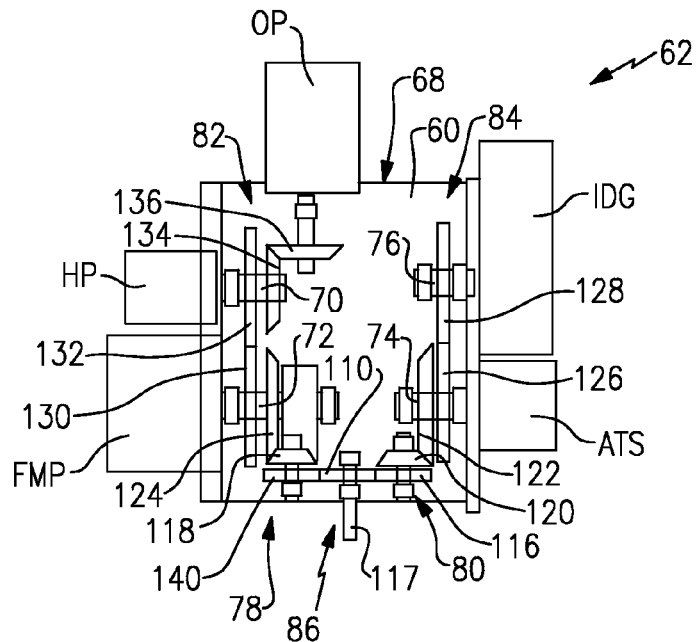
FIG. 6 is a schematic representation of a geartrain of the example accessory gearbox.

Referring to FIGS. 4, 5 and 6, the accessory gearbox 60 provides flexibility in design by removing constraints necessitated by the use of three-way bevel gearing arrangements in previous accessory gearboxes. The example accessory gearbox 60 includes the first and second driven gear sets 78, 80 that rotate about corresponding first and second drive axes 90, 88 parallel to the input axis T. Each of the first and second driven gear sets 78, 80 in turn drive a corresponding one of the first and second geartrains 82, 84.

The example accessory gearbox 60 provides for the adaptation to space constraints by providing for independent adjustment and configuration due at least in part to the use of independent bevel gear sets. Accordingly, an inclusive angle 96 between the second drive axis 88, axis 73 and a second plane 92 (best shown in FIG. 5) intersecting gears of the second geartrain 84 is independent of an inclusive angle 98 between the first drive axis 90, axis 75 and a first plane 94 (best shown in FIG. 5) intersecting gears of the first geartrain 82. The first plane 94 intersects each of the gears of the first geartrain 82 and the axis 75 about which shaft 72 rotates. The second plane 92 intersects each of the gears of the second geartrain 84 and the axis 73 about which shaft 74 rotates. The inclusive angles 98 and 96 are a function of the configuration of first and second driven bevel gears 118, 120. Because the driven bevel gears 118, 120 are of a 2-way configuration, the angle of one does not dictate the angle of the other. Accordingly, the inclusive angles 96 and 98 may be different, and are not dependent on each other.

Each of the first and second drive gear sets 78, 80 includes a drive spur gear 140, 116 that is driven by a tower shaft spur gear 110 driven by the tower shaft 117. The first and second drive gear sets 78, 80 rotate about the axes 90, 88 parallel to the input axis T. First and second spur angles 106 and 104 are also independent of each other and provide for varied placement and alignment of the corresponding geartrains 82, 84. The example spur angle is that angle between the gearbox axis GB and a plane defined between the input axis T and the corresponding one of the first and second drive axes 90, 88. In this example the first and second spur angles 106 and 104 are the same; however, these angles can be adjusted to conform the example accessory gearbox 60 to a desired installation space.

A first geartrain angle 102 is defined between the first plane 94 of the first geartrain 78 and a plane extending between the first drive axis 90 and the axis 75 of the shaft 72 in the first geartrain 82 that includes the bevel gear 124. A second geartrain angle 100 is defined between the second plane 92 of the second geartrain 84 and a plane extending between the second axis 88 and the axis 73 of a shaft 74 in the second geartrain 84. The first and second geartrain angles 102, 100 are independent of each other and therefore provide further gearbox adaptation flexibility.

The second driven bevel gear 120 is mated with bevel gear 122 that drives the shaft 74 of the second geartrain 84. The second drive bevel gear 120 and the bevel gear 122 are sized to provide a desired input speed of the ATS along with defining the inclusive angle 96. An ATS spur gear 126 is supported on the shaft 74 along with the bevel gear 122 to drive the IDG spur 128 gear supported on shaft 76. The gear ratio between the IDG spur gear 128 and the ATS spur gear 126 provides the desired input speed for the IDG.

The first driven bevel gear 118 drives the FPM bevel gear 124 at a desired speed for the FPM. Because the geartrains 82, 84 are driven by independent first and second drive gear sets 78, 80, the first driven component of each geartrain 82, 84 can be driven at different speeds. In this example, the shaft 72 supports the FPM bevel gear 124 and an FPM spur gear 130. The FPM spur gear 130 in turn drives an HP spur gear 132 supported on shaft 70. The shaft 70 further supports the HP bevel gear 134 that drives the OP bevel gear 136 that drives the OP supported on the aft side 68. It should be understood, that the specific features of the exemplary gearbox 60 may be modified to support and drive various other accessory components.

Figure 7:
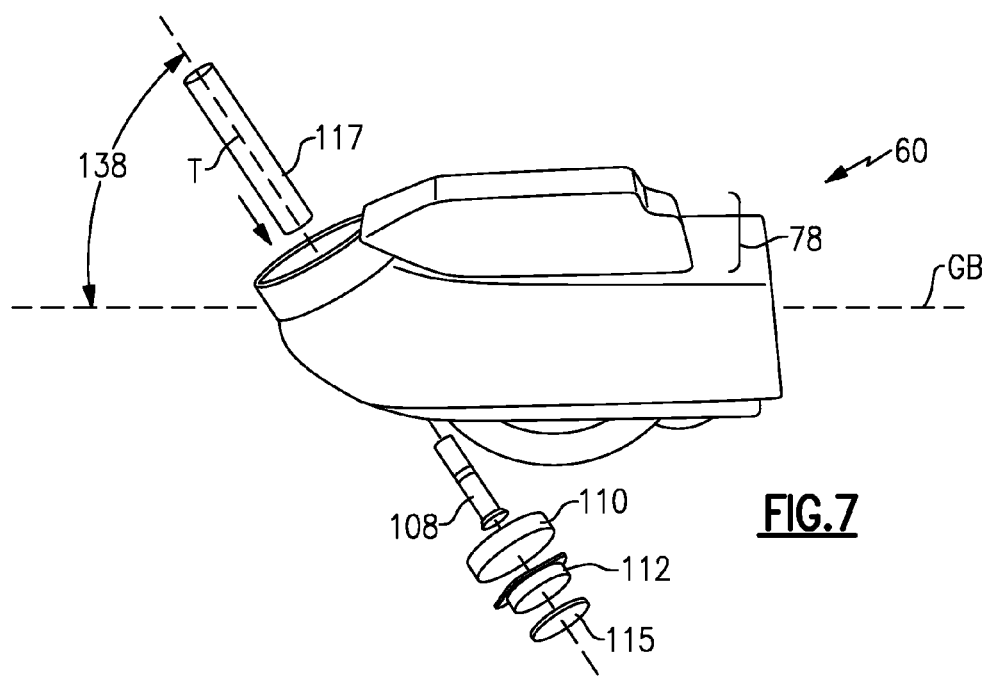
FIG. 7 is a partial exploded view of the accessory gearbox illustrating an example method of removing a towershaft.

Referring to FIG. 7, the example gearbox 60 provides for the removal of the engine tower shaft 117 without removal of the gearbox 60. In this example, the towershaft 117 is removable through the gearbox 60. Removal is facilitated by removing a tower shaft cover 115, tower shaft bearing 112, tower shaft spur gear 110 and a coupler shaft 108. Once these features are removed, the tower shaft 117 can be removed through the accessory gearbox 60. The input axis T is disposed at an angle 138 relative to the gearbox axis GB. The front portion of the example gearbox 60 is angled to accommodate the angle 138 thereby providing a slimmer forward profile. Moreover, separation of the bevel gears from the tower shaft 117 as is provided by the parallel first and second driven gear sets 78, 80 simplifies removal by eliminating any requirement to remove portions of the geartrains 82, 84.

Variations of the disclosed accessory gearbox 60 are possible while maintaining the configuration of the first and second drive spur gears 140, 116 and modification to the drive bevel gears 118 and 120 to accommodate the requirements of individual applications.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An accessory system for a gas turbine engine comprising:
    an accessory gearbox which defines an accessory gearbox axis, the accessory gearbox including a first side and a second side;
    a first geartrain within the accessory gearbox including one or more shafts rotatable about axes perpendicular to the first side of the accessory gearbox;
    a second geartrain within the accessory gearbox including one or more shafts rotatable about axes perpendicular to the second side of the accessory gearbox;
    a driven gear set defining an input axis;
    a first drive gear set driven by the driven gear set about a first drive axis for driving the first geartrain; and
    a second drive gear set driven by the driven gear set about a second drive axis for driving the second geartrain,
    wherein the first drive axis and the second drive axis are substantially parallel to the input axis.

2. The accessory system for a gas turbine engine as recited in claim 1, wherein the first drive gear set comprises a first spur gear, the second drive gear set comprises a second spur gear, and the driven gear comprises a drive spur gear driving the first and second spur gears.

3. The accessory system as recited in claim 2, wherein the first drive gear set includes a first bevel gear for driving the first geartrain and the second drive gear set includes a second bevel gear for driving the second geartrain, wherein the first bevel gear defines a first inclusive angle between the first side and the first drive axis and the second bevel gear defines a second inclusive angle between the second side and the second drive axis.

4. The accessory system as recited in claim 3, wherein the first inclusive angle is independent of the second inclusive angle.

5. The accessory system for a gas turbine engine as recited in claim 1, including a first spur angle between the accessory gearbox axis and the first drive axis and a second spur angle between the accessory gearbox axis and the second drive axis.

6. The accessory system for a gas turbine engine as recited in claim 5, wherein the first spur angle is independent of the second spur angle.

7. The accessory system for a gas turbine engine as recited in claim 1, comprising a tower shaft driving the driven gear set.

8. The accessory system for a gas turbine engine as recited in claim 7, wherein the driven gear set is removable from the accessory gearbox such that the tower shaft is removable through the accessory gearbox.

9. The accessory system for a gas turbine engine as recited in claim 1, wherein the first geartrain drives at least one accessory component removably mounted to the first side and the second geartrain drives at least one accessory component removably mounted to the second side.

10. The accessory system for a gas turbine engine as recited in claim 1, including an aft side transverse to the first and second sides and an aft geartrain including a shaft rotatable about an axis perpendicular to the aft side, the aft geartrain driven by one of the first and second geartrains for driving at least one accessory component mounted to the aft side.

11. A gas turbine engine comprising:
an engine case section defined about an engine axis of rotation;
an accessory gearbox which defines an accessory gearbox axis parallel to the engine axis of rotation, the accessory gearbox mounted to the engine case section and includes first and second sides;
a first geartrain within the accessory gearbox including one or more shafts aligned within a first plane transverse to the first side of the accessory gearbox;
a second geartrain within the accessory gearbox including one or more shafts aligned within a second plane transverse to the second side of the accessory gearbox;
a driven gear set defining an input axis;
a first drive gear set driven by the driven gear set about a first drive axis for driving the first geartrain, the first drive gear set including a first bevel gear defining a first inclusive angle between the first drive axis and the first plane; and
a second drive gear set driven by the driven gear set about a second drive axis for driving the second geartrain, the second drive gear set including second bevel gear defining a second inclusive angle between the second drive axis and the second plane.

12. The gas turbine engine as recited in claim 11, wherein the first geartrain drives at least one accessory component removably mounted to the first side and the second geartrain drives at least one accessory component removably mounted to the second side.

13. The gas turbine engine as recited in claim 11, wherein the first and second drive axes are parallel to the input axis.

14. The gas turbine engine as recited in claim 11, including a tower shaft driving the driven gear set, the tower shaft removable through the accessory gearbox.

\* \* \* \* \*